Figure 1:
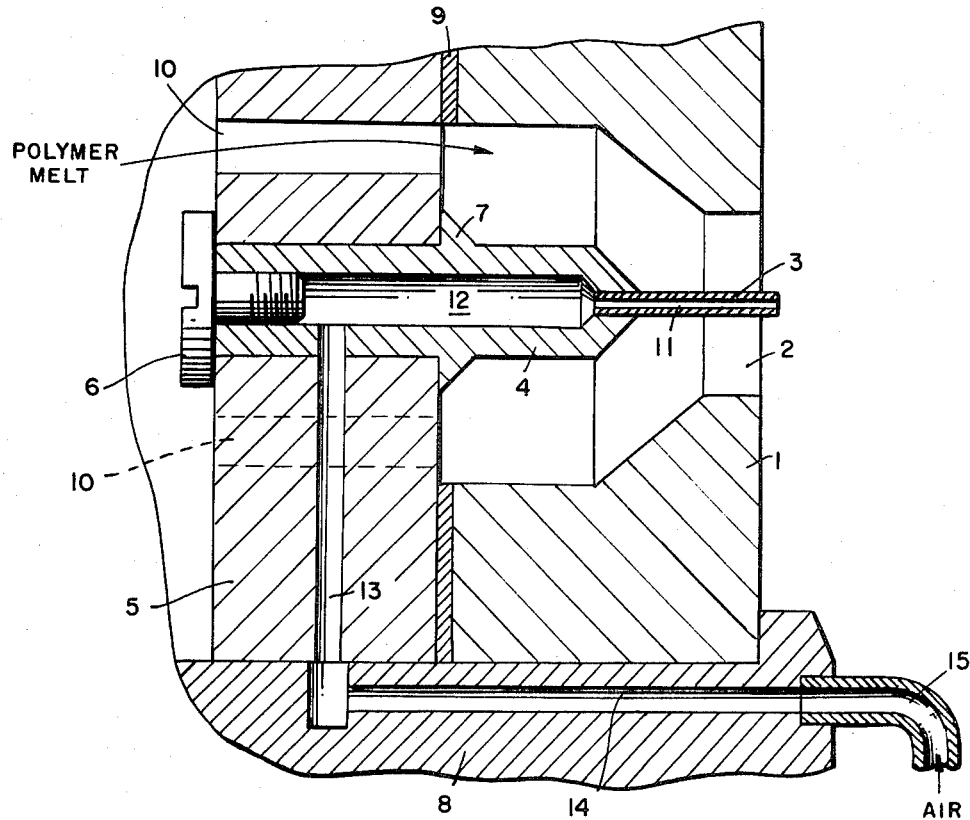

United States Patent

[11] 3,630,824

| [72] | Inventor | Gunter Rohlig<br>Remscheid-Lennep, Germany |
|---|---|---|
| [21] | Appl. No. | 825,608 |
| [22] | Filed | May 19, 1969 |
| [45] | Patented | Dec. 28, 1971 |
| [73] | Assignee | Barmag Barmer Maschinenfabrik AG<br>Wuppertal, Germany |
| [32] | Priority | May 22, 1968 |
| [33] | | Germany |
| [31] | | P 17 60 467.0 |

[54] HOLLOW MONOFILAMENT OF HIGH-LOADING CAPACITY AND METHOD OF MAKING SAME
10 Claims, 2 Drawing Figs.

[52] U.S. Cl. .................................................. 161/178,
264/209, 264/210
[51] Int. Cl. .................................................... D01d 5/24
[50] Field of Search ............................................ 161/178;
264/184, 209, 210; 18/14; 138/118, 178

[56] References Cited
UNITED STATES PATENTS

| 3,095,258 | 6/1963 | Scott | 264/209 |
|---|---|---|---|
| 3,160,193 | 12/1964 | Baggett et al. | 161/178 |
| 3,389,548 | 6/1968 | Lachaussee et al. | 161/178 |
| 3,452,130 | 6/1969 | Pitzl | 264/210 F |
| 3,507,948 | 4/1970 | Buntin | 264/210 F |

*Primary Examiner*—Robert F. Burnett
*Assistant Examiner*—Linda C. Koeckert
*Attorney*—Johnston, Root, O'Keeffe, Keil, Thompson & Shurtleff

ABSTRACT: Process for producing an industrial monofilament of a fiber-forming thermoplastic polymer in which the polymer is melt spun as a hollow filament into an aqueous bath and withdrawn therefrom through a hot air zone while stretching in both the bath and the hot air zone to reduce the hollow cross section to less than 15 percent and especially less than 3 percent of the total cross section. The resulting monofilaments with a relatively fine hollow channel and outer diameters between about 0.8 and 8 mm. are useful for making nets, ropes, fishing lines and the like.

INVENTOR:
GÜNTER RÖHLIG
BY
Johnston, Root, O'Keeffe, Keil, Thompson & Shurtleff
ATT'YS

HOLLOW MONOFILAMENT OF HIGH-LOADING CAPACITY AND METHOD OF MAKING SAME

This invention relates to an industrial monofilament of a synthetic, fiber-forming, linear thermoplastic polymer having a relatively large and uniform loading capacity. The term "industrial monofilament" is understood in this art as being a monofilament which, after being melt-spun and fully stretched, exhibits a diameter of more than 0.8 mm. up to about 8 mm., preferably about 1 to 6 mm. It will be further understood that such industrial monofilaments generally have a circular cross section although it is also feasible to melt spin the monofilaments with an elliptical or any optional profiled cross section. Such industrial filaments are employed in relatively heavy duty applications where it is necessary to provide a high tensile strength or loading capacity in a manner which cannot be achieved with smaller diameter filaments.

The production of industrial monofilaments from fiber-forming thermoplastic polymers so as to obtain diameters on the order of magnitude set forth above, i.e. about 0.8–8 mm., has always been faced by certain difficulties which are not easy to overcome. Thus, it is always necessary to more or less rapidly cool the freshly spun or extruded monofilament, for example as it leaves the nozzle of a screw extruder, and this cooling inevitably causes the formation of uncontrolled and undesirable hollow spaces, hereinafter designated as "vacuoles." Such vacuoles represent an especially serious problem because they occasionally constitute up to 50 percent of the entire cross section of the monofilament. It is also aggravating that these vacuoles only rarely become positioned concentrically or centrally of the cross section of the monofilament, i.e. in most cases they are offcentered and often extend up to the circumferential zone of the monofilament. When the monofilament is stretched, there is a considerable higher degree of fiber orientation and a correspondingly greater tensile strength in the circumferential zone than in the central or axial area of the cross section, and it is therefore apparent that the presence of vacuoles, especially those which most commonly occupy an eccentric position, will considerably reduce the tensile strength and loading capacity of the entire monofilament. In many instances, the presence of these vacuoles results in a monofilament which is not at all useful for its intended purpose of providing a high loading capacity. Furthermore, both the size and the position of the vacuoles along the length of monofilament cannot be predicted or controlled under known processing conditions. As a result of this random formation of vacuoles, the loading capacity of the final industrial monofilament cannot be predetermined with any certainty.

The undesirable vacuoles of these industrial monofilaments are essentially produced by the shrinking action developed during cooling and solidification of the hot spun monofilament. In order to overcome this formation of vacuoles by the shrinkage of the monofilament, attempts have previously been made to cool the freshly spun monofilament as slowly as possible. For this slow cooling, it is necessary to use a cooling bath liquid which has a relatively high boiling point, preferably an organic liquid. This slow cooling requires a large amount of cooling bath liquid which in turn occupies a relatively large space, often requiring a cooling bath which is several meters deep. Apart from this space requirement, this slow cooling technique does not provide sufficiently satisfactory results. Also, some thermoplastic polymers such as polyamides cannot be efficiently or economically processed in this manner into monofilaments because they are attacked by the commonly employed high-boiling organic cooling liquids, e.g. triethylene glycol, glycerol or the like, and the polymer is decomposed to a certain extent in the cooling bath. A further substantial disadvantage of this slow cooling technique resides in the fact that the organic cooling agents adhere to the monofilaments in an undesirable manner and can later be removed from the surface of the monofilament only with great difficulty.

One object of the present invention is to provide an industrial monofilament or a fiber-forming thermoplastic polymer which has the usual nominal or outer diameter required to provide a high loading capacity but which also possesses a specific and definite loading capacity or tensile strength throughout a predetermined, uniform cross section. More particularly, it is an object of the invention to provide an industrial monofilament of conventional size and overall cross-sectional shape which is essentially free of randomly positioned large vacuoles and which is more nearly equivalent to a completely solid, stretched monofilament. Still another object of the invention is to provide a process for the production of a hollow thermoplastic monofilament with a uniform and high loading capacity wherein the filament is not decomposed along its surface by a corrosive and/or adherent cooling liquid. Yet another object of the invention is to provide a process for the production of such industrial monofilaments which can be carried out in an efficient and economical manner under relatively rapid cooling conditions. These and other objects and advantages of the invention will become more apparent upon consideration of the following detailed disclosure.

It has now been found, in accordance with the invention, that a suitable process can be carried out in order to provide a melt-spun and stretched-oriented monofilament of a synthetic, fiber-forming, linear thermoplastic polymer having an outer diameter of from 0.8 mm. to about 8 mm. and a coaxial, substantially concentric hollow channel extending throughout its length to provide an approximately uniform hollow cross section which occupies about 0.2 to 15 percent, preferably 0.5 to 10 percent, of the total cross section of the monofilament. Industrial monofilaments with this fine central channel, especially where the hollow cross section occupies less than about 3 percent of the total cross section of the monofilament, permit one to achieve nearly the same loading capacity as a completely solid monofilament in the final stretched product. In effect, the industrial monofilament of the invention has a very large and uniform solid annular cross section surrounding a single fine channel extending uniformly and concentrically along the axis of the filament. The industrial monofilament of the invention thereby constitutes a considerable improvement and advance over previously known industrial monofilaments which have always contained randomly positioned and often very large eccentric vacuoles.

A specific process is also provided in accordance with the invention for the production of the novel industrial monofilament composed of the fiber-forming, thermoplastic polymer, the process essentially including the following steps:

melt-spinning a hollow monofilament of the thermoplastic polymer by extrusion through an annular opening around one end of a coaxial and concentric small hollow tube which is in fluid communication with the outside atmosphere at its opposite end; withdrawing the spun hollow monofilament through an aqueous cooling bath for solidification of the polymer while imparting a first stretch sufficient to partly reduce the inner and outer diameter of the monofilament; and further withdrawing the solidified and partly stretched monofilament through a hot air zone while imparting a second stretch thereto, the size of the initially spun monofilament (i.e. its inner and outer diameters) and the amount of stretching imparted thereto being sufficient to reduce the outer diameter to about 0.8 to 8 mm. and the inner diameter to a value of about 0.1 to 15 percent of the outer diameter. Again, it is especially desirable to carry out both of the stretching steps so that the inner diameter of the hollow monofilament is reduced to a value of less than 3 percent of the outer diameter.

The inner diameter of the spun and stretched monofilament according to the invention should be sufficiently large so that it still exists at least up to the time at which the entire monofilament cross section has been completely solidified in the aqueous bath. On the other hand, the fine channel in the final stretched monofilament product should be sufficiently small so that it is practically closed or at least substantially narrower than in the freshly spun filament. In most cases, very satisfactory results are achieved if the fine channel becomes narrowed during the stretching procedure so as to be reduced below about 3 percent down to about 0.2 percent, because the resulting monofilament closely approximates the tensile strength or loading capacity of a completely solid filament.

Every plastic, especially thermoplastic polymers, tend to shrink when they are solidified by cooling and this shrinkage likewise occurs when cooling the freshly spun or extruded industrial monofilament which must have a relatively large diameter or overall cross section. During the cooling of the hot monofilament, solidification extends or continues gradually from the outer circumference of the filament to the middle of the cross section. In the external or circumferential area of the filament, the initially cooled material has a tendency in spite of its shrinkage effect to draw up the hot and still plastic material from the interior of the cross section. This phenomenon is believed to be the cause of the above-noted disadvantages in conventional industrial monofilaments, i.e. the formation of uncontrolled and different sized vacuoles distributed randomly over the entire length of the monofilament. Because of the random concentration and proportionately large size of these vacuoles in the monofilament, there is a considerable weakening of the cross section of the monofilament wherever the vacuoles are located and especially in those cross sections containing very large vacuoles.

The fine longitudinal hollow channel located on the central axis of the industrial monofilament according to the invention, as initially formed in the freshly spun filament, apparently causes a uniform shrinkage over the entire length of the monofilament, i.e. so that there is the same degree of shrinkage in each cross section. Even with rapid cooling, the previously experienced formation of vacuoles at random positions and in random sizes does not occur when using the process of the invention. Although some vacuoles may form, they appear to be absorbed into the nearly concentric hollow channel extending throughout the monofilament. In a sense, the vacuoles seem to flow off coherently or in interconnected form into the central channel.

Thus, it is a decisive advantage of the industrial monofilament according to the invention in that the circumferential zone or solid annular area of the filament with its high tensile strength is undisturbed and that the fine hollow channel running therethrough has a substantially uniform cross-sectional area so that the tensile strength remains constant over the entire length of the monofilament. In other words, the loading capacity of the industrial monofilament of the invention can be accurately predetermined and is generally much higher than those monofilaments produced by previously known processes.

For most industrial or commercial purposes, it is usually most advantageous to provide a monofilament which has an overall circular cross section. However, it is also possible to provide other conventional cross-sectional shapes with the understanding that cross-sectional proportions should remain substantially the same as specified herein with the diameters being considered as average diameters.

It is possible to use any of the well-known fiber-forming thermoplastic polymers for purposes of producing an industrial monofilament according to the present invention. In achieving high loading capacities, it is naturally desirable to employ those fiber-forming polymers which can be stretched and oriented into a filament of high tensile strength. Suitable polymers include polyolefins, especially polypropylene, linear polyamides such as polycaprolactam and polyhexamethylene adipamide (commonly referred to as nylon), linear polyesters such as polyethylene terephthalate, and many others.

Various processing conditions, such as the temperature of the polymer melt or the temperature of the cooling bath, will naturally extend over a wide range depending upon the particular thermoplastic polymer being utilized. This is also true of the amount of stretch imparted to the hollow monofilament in the two stages of the process, apart from the fact that the stretching can obviously be varied in order to achieve different tensile strengths. However, all of these processing conditions are quite well known from the synthetic fiber art and there is an abundance of readily available data concerning the spinning and stretching of such materials. The present invention is not directed to these known conditions but instead is concerned with a specific combination of process steps and the resulting hollow monofilament having a particular structure. Thus, the present invention does not require anything more than conventional and readily available apparatus as well as a general knowledge of the usual temperature and stretching or drawing conditions required for any specific fiber-forming polymer.

Figure 2:
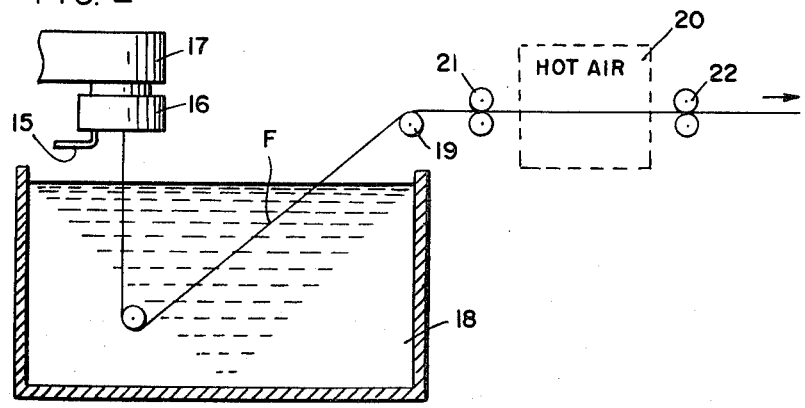

Suitable apparatus for producing the hollow monofilaments of the invention is shown in the accompanying drawing in which:

FIG. 1 is a partial cross-sectional view of a spinning head taken along the axis of the extrusion nozzle adapted to spin a hollow filament; and FIG. 2 is a schematic flow sheet illustrating the essential steps in the production of the melt-spun and stretch-oriented monofilament.

Referring first to FIG. 1, a conventional nozzle plate 1 contains one or more nozzle openings or spinning orifices 2 in which there is coaxially centered a small air tube 3 projecting slightly forward of the face of the nozzle plate 1. This air tube 3 enters into a somewhat larger cylindrical mounting tube 4 fastened securely to a bridge plate 5 by means of the threaded bolt 6 and the offset shoulder 7 on the mounting tube. The two plates 1 and 5 can also be bolted or clamped tightly together within the casing member or housing 8, preferably with a gasket seal 9 pressed therebetween. The polymer melt flows from the screw extruder as indicated through several bores 10 around the mounting tube 4 in plate 5. As the hot polymer melt is extruded outwardly through the nozzle opening 2, an inner hollow channel of the monofilament is formed around the small projecting tube 3, and as the filament is drawn off, it tends to create a suction pulling air through the tubular passageway defined by the inner bore 11 of tube 3, the enlarged inner bore 12 of mounting tube, the radially directed passage 13 in plate 5, the longitudinal passageway 14 in casing member 8 and finally the deflected pipe or inlet tube 15.

Surprisingly, the freshly spun hot filament, which is still in a highly plastic state, does not collapse onto the hollow central channel through the suction or vacuum effect produced at the outlet end of the small tube 3, but instead the monofilament substantially retains the outer diameter defined by nozzle opening 2 and the inner diameter defined by the tube 3. Thus, it is not necessary to inject cold air or some other fluid through the passageway as is often required in the conventional production of hollow filaments having relatively thin annular walls.

As shown in FIG. 2, the spinning head 16 containing the nozzle plate arrangement of FIG. 1, including inlet air tube 15, is mounted in a vertical extrusion position on a conventional screw press or screw extruder 17. The monofilament F with a hollow channel is drawn downwardly into the aqueous cooling bath 18 where it is substantially solidified by the time that it passes around the deflecting roller or guide pin 19 and is removed upwardly out of the bath. The monofilament is partly stretched in the bath while being cooled and solidified through suitable regulation of the rate at which it is withdrawn. The amount of stretching is preferably sufficient to reduce the outer and inner diameters of the hollow monofilament to approximately one-half of their value at emergence from the spinning nozzle. The exact extent of stretching in this first stage is of course dependent on a large number of factors, including the type of polymer being used and the degree of stretching desired in the second stage of the process. Also, within the prescribed limits of the relative proportion of the hollow channel cross section, the final reduction of outer and inner diameters can be easily varied. For this reason, the preferred reduction of about one-half in the initial stretching stage serves only as an approximate guide and a preferred upper limit. Some stretching is desirable to achieve a more gradual narrowing of the axial concentric channel and also to ensure against the formation of vacuoles, i.e. so that these vacuoles tend to run into and become a part of the fine channel.

In most cases, the aqueous bath should be maintained at temperatures substantially below 100° C. by providing a smooth or nonturbulent circulation of the water. For example, it is convenient when treating the usual hot spun polymers to employ a bath temperature of approximately 15–65° C., preferably about 20–50° C. At these relatively low bath temperatures, cooling and solidifying of the freshly spun filaments occurs much more quickly than when using organic liquids with a much higher boiling point.

The monofilament F is conducted from the bath 18 over the roller or guide pin 19 and is then stretched in a chamber 20 heated with hot air or any conventional and readily available hot gas to provide the correct stretching temperature for the particular fiber-forming polymer being treated. Optimum stretching temperatures for individual polymers are well known, but must be sufficiently low to permit orientation of the polymer molecules. This stretching operation is carried out in the conventional manner between two pairs of nip rollers 21 and 22, the draw rolls 22 rotating more rapidly than the feed rolls 21. The completely stretched monofilament with its final reduction of outer and inner diameter is then directed to any suitable takeup spool or winding mechanism (not shown).

The second stage of stretching in the hot air zone strongly develops the tensile strength or loading capacity in the large annular solid portion of the monofilament while retaining a substantially uniform fine concentric channel which is so reduced in size that the total tensile strength is only slightly reduced from that of the corresponding filament having a completely solid cross section, i.e. the hypothetical ideal filament.

The following working examples will provide a further illustration of the invention, with the understanding that the invention is not limited to the specific data of these examples. The individual experiments were carried out with the type of apparatus shown in the drawing and explained in detail above so that further reference to the drawing is not necessary.

EXAMPLE 1

An industrial monofilament is produced from polypropylene with a nominal (outer) diameter of 2 mm. For this purpose, there is used a screw extruder with an extrusion head or die having one or several monofilament nozzles of circular cross section. The inner diameter of the nozzle, i.e. the extrusion orifice, amounts to 10 mm. A small tube is arranged coaxially in the nozzle and has an outer diameter of 1 mm. and an inner diameter of 0.5 mm. The bore of this small tube is in fluid connection with the outside atmosphere.

The still hot and plastic monofilament emerging from the nozzle has an outer diameter of about 10 mm. The coaxial fine channel formed around the inner tube exhibits an inside diameter which is slightly reduced to only about 0.6 mm. in spite of the suction which arises at the outlet end of the 1 mm. rigid tube. At an interval of 80 mm. from the nozzle, the hot monofilament enters into the cooling bath. As the cooling liquid, there is employed water at a temperature of about 40° C. to 50° C. The drawing-off speed of the monofilament is chosen such that the outer diameter after solidification of the polypropylene amounts to 5.3 mm. The inner diameter corresponding to the fine hollow channel then acquires a value of 0.3 mm.

After exiting from the cooling bath, the solid monofilament is stretched in a hot air zone by a ratio of 1:7. The outer diameter of the completed filament then amounts to only 2 mm. while the fine hollow channel running coaxially therethrough provides an inside diameter of about 0.014 to 0.015 mm. This corresponds to a ratio of the entire cross section of the monofilament to the cross section of the hollow channel of about 267 to 1, or expressed on a percentage basis, the cross section of the hollow channel amounts to about 0.37 percent of the entire filament cross section.

EXAMPLE 2

An industrial monofilament is produced from polycaprolactam (nylon 6) with a nominal diameter of 2 mm. A screw extruder is employed with a die having one or several monofilament nozzles of circular cross section. The inner diameter of the extrusion nozzle amounts to 8 mm. A small fixed tube arranged coaxially in the nozzle has an outer diameter of 2.5 mm. The bore of the tube is in fluid communication with the outside air and has an inner diameter of about 1.5 mm.

The still hot, plastic material emerging directly from the nozzle has an outer diameter of 8 mm. while the coaxial hollow channel at a point closely adjacent the end of the 2.5 mm. rigid tube exhibits an inside diameter reduced to only about 2 mm. in spite of the suction which occurs at this point. The hot monofilament enters the cooling bath at an interval of 60 mm. from the nozzle. Water is employed as the cooling liquid at a temperature of about 20° C. to 40° C.

The speed at which the monofilament is drawn off through the cooling bath is selected such that the outer diameter of the filament after the polycaprolactam has solidified amounts to 4 mm. The longitudinal hollow channel exhibits an inside diameter at this stage of about 0.4 mm. After exiting from the cooling bath, the monofilament is stretched in a hot air zone in a stretching ratio of 1:4. The outer diameter of the resulting finished industrial filament then amounts to only 2 mm. while the inside diameter of the fine coaxial hollow channel is about 0.2 mm. The ratio of the total cross section of the monofilament to the cross section of the fine channel is thus about 100:1. The hollow space of the cross section accordingly makes up about 1 percent of the total cross section of the filament. The loading capacity is likewise only about 1 percent less than that of the ideal solid monofilament of the same outer diameter.

COMPARATIVE EXAMPLE

As in the preceding example, a monofilament of polycaprolactam is produced with a nominal diameter of 2 mm. by initial extrusion from a screw extruder equipped with a die containing one or several monofilament nozzles of circular cross section, the inner diameter of the nozzle being 8 mm. In this case, however, no small tube in fluid communication with the outside air is arranged in the nozzle.

The still hot, plastic material emerging directly from the nozzle is then handled in exactly the same manner as in example 2, i.e. by drawing through the same water bath and subsequently stretching in a hot air zone. The outer diameter of the completely stretched monofilament amounts to slightly more than 2 mm. The largest vacuoles capable of being determined at random points along the monofilament occupy 49.2 percent of the entire monofilament cross section. The loading capacity of this comparative monofilament thus lies about 49 percent lower than the loading capacity of an ideal solid monofilament of the same diameter.

As will be noted from the foregoing examples, the monofilament of the present invention yields a highly uniform cross section over its entire length and therefore possesses a very high average loading capacity, subject only to very minor deviations in cross-sectional dimensions. Large random vacuoles are completely avoided so as to yield a much more satisfactory industrial monofilament than is possible when attempting to extrude without the inner concentric channel. Furthermore, the monofilament of the present invention can be produced in a water bath which does not have any serious effect on the surface of the filament and which permits rapid cooling as well as easy removal of adherent water, e.g. by simple air drying.

The industrial monofilament of the invention with its relatively fine hollow channel is quite distinct from previously known hollow filaments which are intended to have a large hollow cross section and only thin annular walls, i.e. so as to provide a voluminous and easily compressed fiber for certain textile fabrics or felts. These prior hollow filaments have considerably smaller outer diameters and proportionally larger inner diameters so that they did not present the serious problems arising in the production of industrial monofilaments. In this sense, the extruded and stretched monofilaments of the present invention should not be considered as hollow tubular filaments because the fine coaxial channel within a very large outer diameter according to the invention yields a completely different type of product as required of a load bearing industrial filament.

The process of the present invention likewise provides a substantial improvement over previous techniques of producing industrial monofilaments. This process not only ensures a predetermined high loading capacity with a filament of uniform cross section, but also permits economies in space and time as well as avoiding defects on the surface of the monofilament.

The invention is hereby claimed as follows:

1. A melt-spun and stretch-oriented monofilament of a synthetic, fiber-forming, linear thermoplastic polymer having an outer diameter of from 0.8 mm. to about 8 mm. and a coaxial, substantially concentric hollow channel extending throughout its length to provide an approximately uniform hollow cross section which occupies about 0.2 to 15 percent of the total cross section of the monofilament, said monofilament being essentially free of randomly and eccentrically positioned vacuoles.

2. A monofilament as claimed in claim 1 wherein said hollow cross section occupies about 0.5 to 10 percent of the total cross section of the monofilament.

3. A monofilament as claimed in claim 1 wherein said hollow cross section occupies less than 3 percent of the total cross section of the monofilament.

4. A monofilament as claimed in claim 1 composed of polypropylene.

5. A monofilament as claimed in claim 1 composed of nylon.

6. A monofilament as claimed in claim 1 having a substantially circular cross section.

7. A process for the production of an industrial monofilament of a synthetic, fiber-forming, linear thermoplastic polymer which comprises:

melt-spinning a hollow monofilament of said polymer by extrusion through an annular opening around one end of a coaxial and concentric small hollow tube which is in fluid communication with the outside atmosphere at its opposite end;

withdrawing the spun hollow monofilament through an aqueous cooling bath for solidification of the polymer while imparting a first stretch sufficient to partly reduce the inner and outer diameter of the monofilament; and further withdrawing the solidified and partly stretched monofilament through a hot air zone while imparting a second stretch, the size of the initially spun monofilament and the amount of stretching imparted thereto being sufficient to reduce the outer diameter to about 0.8 to 8 mm. and the inner diameter to a value of about 0.1 to 15 percent of the outer diameter.

8. A process as claimed in claim 7 wherein the spun hollow monofilament is stretched sufficiently to reduce the inner diameter to a value of less than 3 percent of the outer diameter.

9. A process as claimed in claim 7 wherein the thermoplastic polymer is polypropylene.

10. A process as claimed in claim 7 wherein the thermoplastic polymer is nylon.

* * * * *